United States Patent [19]
Horigome

[11] Patent Number: 5,864,531
[45] Date of Patent: Jan. 26, 1999

[54] DC LEVEL FLUCTUATION CORRECTION BY SELECTING A TIME CONSTANT COUPLED TO A REPRODUCED SIGNAL

[75] Inventor: Junichi Horigome, Kanagawa, Japan

[73] Assignee: Sony Corporation, Tokyo, Japan

[21] Appl. No.: 836,829

[22] PCT Filed: Sep. 24, 1996

[86] PCT No.: PCT/JP96/02743

§ 371 Date: May 19, 1997

§ 102(e) Date: May 19, 1997

[87] PCT Pub. No.: WO97/02238

PCT Pub. Date: Jan. 23, 1997

[51] Int. Cl.$^6$ .............................. G11B 7/00; G11B 20/10
[52] U.S. Cl. .............................. 369/124; 369/59; 369/48
[58] Field of Search .................... 369/47, 48, 59, 369/124

[56] References Cited

U.S. PATENT DOCUMENTS

| | | | |
|---|---|---|---|
| 5,001,698 | 3/1991 | Naito | 369/59 |
| 5,355,356 | 10/1994 | Johann et al. | 369/59 |
| 5,497,361 | 3/1996 | Mita et al. | 369/124 |
| 5,570,335 | 10/1996 | Ogata et al. | 369/124 |
| 5,684,772 | 11/1997 | Yamagami et al. | 369/124 |
| 5,699,343 | 12/1997 | Moritsugu et al. | 369/124 |

FOREIGN PATENT DOCUMENTS

55-77020 6/1980 Japan.
4-162257 6/1992 Japan.

Primary Examiner—Tod R. Swann
Assistant Examiner—Kim-Kwok Chu
Attorney, Agent, or Firm—Limbach & Limbach L.L.P.

[57] ABSTRACT

A playback apparatus is disclosed for reproducing information data and sync data recorded sequentially in the sectors along tracks of a recording medium, in which a read unit generates a reproduced signal by reading the information data and the sync data, an AC coupling unit generates a corrected reproduced signal by selecting one of a first time constant and a second time constant larger than the first time constant and AC-coupling it to the reproduced signal, a detection unit outputs a detection signal indicating a timing for the read unit to read the sync data, a control unit controls the AC coupling unit in such a manner as to select the first time constant during the period from a first timing determined on the basis of the detection signal to a second timing a predetermined after the first timing and to select the second time constant at the second timing, a binary unit digitizes the corrected reproduced signal and generates a binary corrected reproduced signal, and a demodulator demodulates the information signal produced from the binary corrected reproduced signal. With this simple configuration, the loss of the DC components to be contained in the information data of the reproduced signal is prevented while at the same time shortening the transient state of the sync data portion thereby reproducing the sync data correctly.

6 Claims, 7 Drawing Sheets

FIG. 4A

Recording of Sector Mark

FIG. 4B

Differentiated Reproduced Signal

FIG. 4C

Hold Signal

FIG. 4D

Reproduced Sector Mark

| Moducated Bits | 0 | 1 | 0 | 1 | 0 | 0 | 1 | 0 | 0 | 1 |

Bit Position Recording (NRZ)

Mark Edge Recording (NRZ1)

FIG. 9A
ID Det. Signal

FIG. 9B
MO Det. Signal

FIG. 9C
MO+ID Synthesized Signal

Difference of DC Level

FIG. 9D
ID Det. Signal (Erase)

FIG. 9E
MO Det. Signal (Erase)

(Erase)   (Overwrite)

DC LEVEL FLUCTUATION CORRECTION BY SELECTING A TIME CONSTANT COUPLED TO A REPRODUCED SIGNAL

TECHNICAL FIELD

The present invention relates to a playback circuit, and more in particular to a playback circuit suitably used with a playback system for reproducing the signals read from a disk-shaped recording medium (such as the read-only optical disk, the write-once optical disk or the rewritable optical disk).

BACKGROUND ART

[Evaluation of various data modulation schemes]

The digital data (original information) normally handled by us have a signal format with 0s and 1s aligned in an arbitrary sequence. When considering the characteristics of the recording and reproduction systems, however, this format in its direct form cannot be efficiently used as recording signals. In common practice, therefore, the original information is converted (modulated) into a form suitable for the above-mentioned recording media and recorded, The signal reproduced from the recording medium is restored (demodulated) to the original information. In recent years, various recording codes have been suggested for digital data recording schemes. The characteristics requirements for modulation-demodulation for data in an optical disk, for example, are as follows:

(1) In order to increase the file capacity, a high density is possible.
(2) A self-synchronism is easy for retrieving the information signal from the reproduced signal.
(3) In order to prevent any read error due to fluctuations of a reference level in digitization at the time of reproduction or in order to prevent fluctuations of the servo error signal at the time of recording or reproduction, the frequency spectrum of the modulated signal is DC free (contains no DC components).
(4) Propagation of a bit error is difficult to affect the reproduction of the successively arriving bit information Familiar modulation schemes for recording data on an optical disk include NRZ, NRZI, FM, EFM and (2, 7)-RLL schemes. The number of the same successive bits in the data sequence is called the Run.

The NRZ (Non Return to Zero) scheme is often used for magnetic recording of a hard disk. In this scheme, signal levels for logical values 0 and 1 of digital data exactly correspond to low and high signal levels, respectively. This scheme, therefore, is most easy to understand for conversion of an electrical signal for digital data.

The NRZI (Non Return to Zero Inverse) scheme, on the other hand, is one in which the signal level is inverted only when the logical value of the digital data is 1.

In the NRZ and NRZI schemes, the maximum inversion width Tmax of the data string is infinitely large, and it is understood that self-synchronization is difficult in these modulation schemes. Also, since they are not DC-free, these schemes are not used for recording data in the currently-available optical disks, for which the RLL and EFM modulation schemes are the current choices.

RLL (Run Length Limited) is such an encoding scheme that the maximum inversion width Tmax is finite. Especially, an encoding scheme in which the minimum run is d, the maximum run is k and m bits of data are mapped to n modulated bits is called the (d, k, m, n)-RLL encoding scheme. Depending on the parameters selected, there are several different RLL encoding schemes, which can be determined by the performance evaluation parameters indicating the characteristics of the respective schemes.

In the case where the minimum inversion width Tmin providing one of the evaluation parameters is excessively small, a reproduced waveform interference is caused by the OTF (Optical Transfer Function) or the diffraction limit of the optical pickup. The value Tmin, therefore, is advantageously larger.

Conversely, the maximum inversion width Tmax which is related to the ease of self-synchronization is advantageously smaller. More specifically, in order to enable the extracted sync signal to follow the temporal fluctuations (jitter), if any, of the reproduced signal, the signal is required to be inverted frequently. Also, a long inversion interval poses the problem of fluctuations of the DC component.

The detection window width Tw represents the tolerance of the temporal fluctuation (jitter) of the reproduced signal. The playback jitter in the optical disk is considered to derive from various factors. It is not desirable, however, that data displacement, etc. is caused by the temporal fluctuations of the reproduced signal. Therefore, the detection window width Tw is desirably larger.

Table 1 below shows the evaluation parameters of the main encoding schemes.

TABLE 1

| Modulation code evaluation parameters | | | | | | |
|---|---|---|---|---|---|---|
| Recording code | | | | | | |
| | d | k | m | n | Tmin | Tmax | Tw |
| NRZI | (0) | ( ) | (1) | (1) | 1 | | 1 |
| EFM | 2 | 10 | 8 | 17 | 1.44 | 5.1 | 0.47 |
| (2,7)RLL | 2 | 7 | 1 | 2 | 1.5 | 4 | 0.5 |
| (1,7)RLL | 1 | 7 | 2 | 3 | 1.33 | 5.33 | 0.67 |

The EFM (Eight to Fourteen Modulation) scheme is one in which eight data bits are converted into 14 modulated bits. Two hundred and fifty six (=28) patterns providing d=2 and k=10 are selected from 214 (=214) patterns. In the process, in order to meet the condition of d=2 between different conversion patterns, one of the coupling bits of three "000", "010", "100" and "001" is selected and inserted to reduce the DC components or the low-frequency components in the final waveform string.

Consequently, this scheme has the feature of small DC components or small frequency components. Insertion of the three connecting bits, however, necessarily reduces the recording density. Also, the algorithm for determining the three bits is considerably complicated and thus complicates the configuration of the modulator.

The (2, 7)-RLL modulation scheme, on the other hand, is generally used for recording data in optical disks. This feature of this modulation scheme lies in that the maximum inversion width Tmax is small while the minimum inversion width Tmin is comparatively large. The disadvantage of this scheme, however, is that since two modulated bits is involved for each one data bit, the detection window width Ts is 0.5 T and is not large, where T is the interval of one data bit. Also, the variable word length makes it necessary to determine the word boundary, leading to the disadvantage of easy error propagation. In order to solve this problem, in the case of recording digital data in an optical disk, a sync signal (RESYNC) is required to be inserted for each predetermined section of data to prevent error propagation.

The (1, 7)-RLL modulation, by contrast, which is an encoding scheme closely watched recently, has the advantages of high density and high data rate with which recording is possible. In this scheme, the minimum inversion width Tmin is 1.33 T and somewhat inferior to the figure 1.5 T for the above-mentioned (2, 7)-RLL modulation. In spite of this, since 2 bits of data are converted into three modulated bits, the detection window width Tw of ⅔ is obtained, indicating a comparatively large margin of demodulation. This scheme, however, lacks the processing for reducing the DC components unlike in the EFM modulation, and still has the problem remaining unsolved.

In recording data in the optical disk, a data bit string is converted into the PLL-modulated bits as described above, and then a recording waveform is produced using NRZ or NRZI. Specifically, the input data string providing the original information are RLL-modulated and, thus by changing Tmin and Tmax, is converted into a PLL-modulated bit string in a form more suitable for the optical disk. A recording waveform is obtained by NRZ or NRZI from this bit string.

Figure 6:
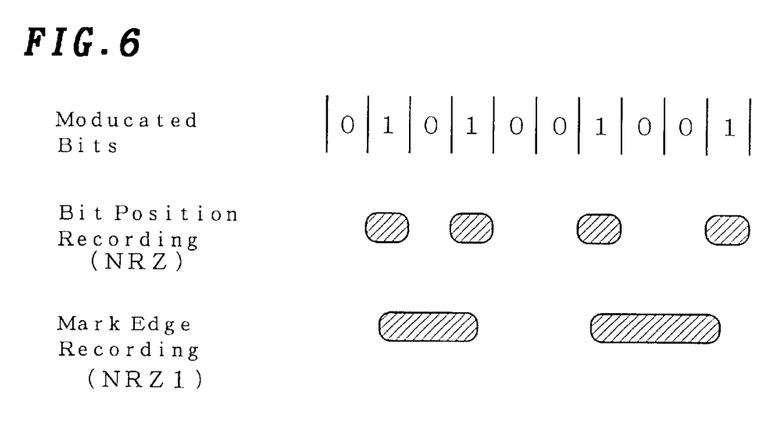
FIG. 6 is a diagram for explaining the bit position recording and the mark edge recording.

The recording scheme using NRZ is called the intermark recording or the bit position recording, as shown in FIG. 6. In the bit position recording, each recording mark corresponds to a modulated bit "1", and the mark position is detected to produce a corresponding bit "1" at the time of playback.

The recording scheme using NRZI, on the other hand, is called the mark length recording or the mark edge recording. In this scheme, the position where the signal level changes, i.e., the leading and trailing edges of a mark correspond to the modulated bits. At the time of playback, the ends of the mark on the disk are detected to produce a corresponding bit "1".

The bit position recording, in which only the presence or absence of the mark is detected, is not easily affected by the disturbance of the mark format (jitter or the like) but has the shortcoming of a low recording density as compared with the mark edge recording in which two modulated bits are recorded per mark. In employing the bit position recording scheme, therefore, a modulated code with a small minimum inversion width Tmin, even with a somewhat small detection window width Tw, is considered suitable for improving the recording density.

The mark length recording scheme has the feature that the recording density can be increased. This scheme cannot be used, however, for some recording media which have marks with different shapes of leading and trailing edges.

[Causes of DC level fluctuations]

Figure 7A:
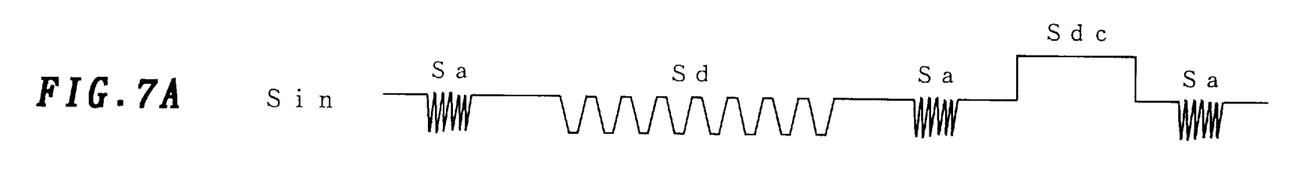
FIGS. 7A to 7C are diagrams for explaining the waveforms of a reproduced signal for different magnitudes of the time constant of the AC coupling circuit used for the signal processing according to the prior art.

The signal (reproduced signal) Sin obtained by reproducing the above-mentioned magneto-optical disk, such as shown in FIG. 7A, for example, generally intermittently contains an address component Sa and a data component Sd. Further, in a writable type of disk (such as the magneto-optical disk), the DC level Sdc fluctuates due to an increased light amount required for erasing or writing data.

(DC level fluctuation)

The main cause of the DC level fluctuation is the difference in reflectance between the CD section and the MO section, and it also occurs at the time of erasure. The respective DC level fluctuations will be specifically described taking a rewritable optical disk as an example with reference to FIGS. 8 and 9.

(1) DC level fluctuation between CD and MO sections

Figure 8:
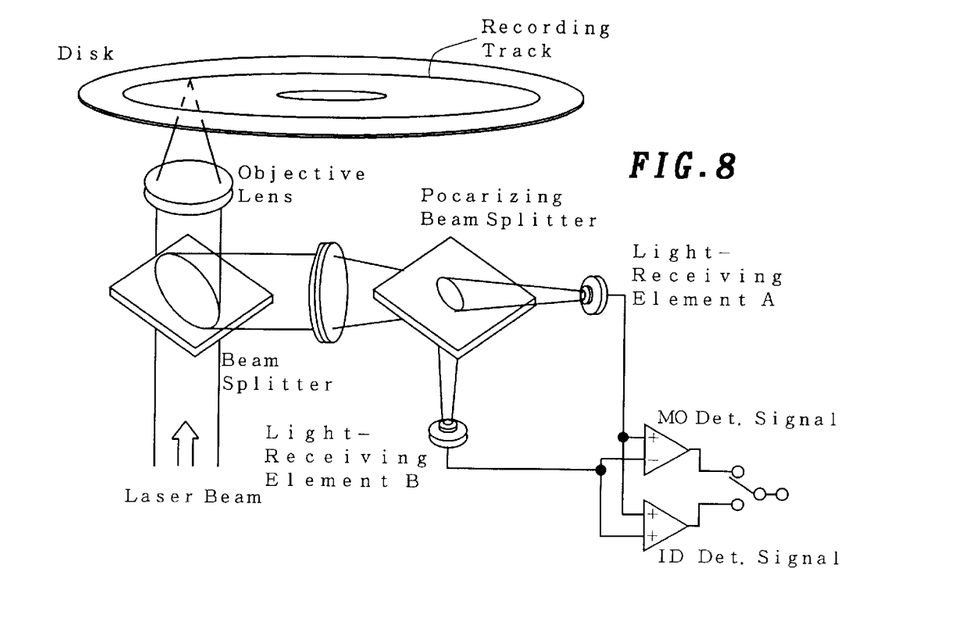
FIG. 8 is a diagram for explaining the essential parts of the magneto-optical detection system of the magneto-optical disk system.
Figure 9A:
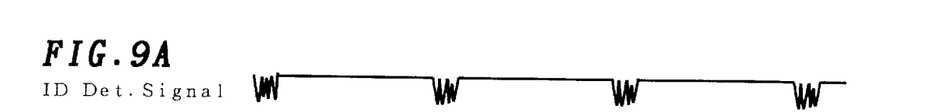
FIGS. 9A to 9E are diagrams for explaining the status of the ID detection signal and the MO detection signal of the magneto-optical detection system shown in FIG. 8.
Figure 9B:
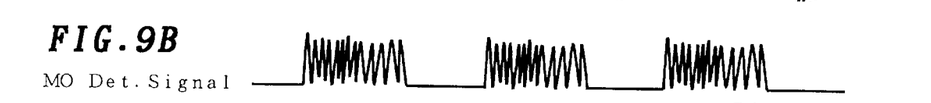

Take the magneto-optical disk as an example. As shown in FIG. 8, the magneto-optical signal detector includes an ID (or CD) detection system for detecting bit information and a MO detection system permitting recording and erasure. In the ID detection system, the light amount is changed simply according to the presence or absence of a bit, and the sum A+B of the light received by the light-receiving element A and the light-receiving element B is determined as an ID detection signal (FIG. 9A). In the MO detection system, in contrast, the polarization plane of the beam slightly rotates according to S or N of the direction of magnetization. This slight rotation is detected through the PBS (polarizing beam splitter). The input to the light-receiving element A is increased when the polarization plane rotates in positive direction, while the input to the light-receiving element B increases when the polarization plane rotates in negative direction. The difference A−B is determined as an MO detection signal (FIG. 9B). The ID detection signal and the MO detection signal are generated alternately along time axis. These detection signals are synthesized by being switched alternately thereby to constitute a reproduced signal (FIG. 9C).

Figure 9C:
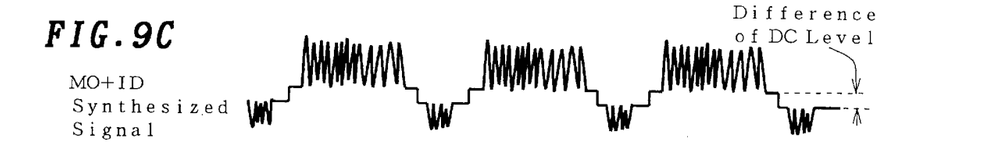

In this magneto-optical detector, the difference in reflectance and an optical imbalance between the MO detection system and the ID detection system may cause a difference in DC level between the two detection signals (FIG. 9C). Also, a combination of the ID detection signal and the MO detection signal is intermittently included in sectors, between which the difference in DC level occurs. This difference in DC level makes correct subsequent binarization impossible.

(2) DC level fluctuation at the time of erasure

Figure 9D:
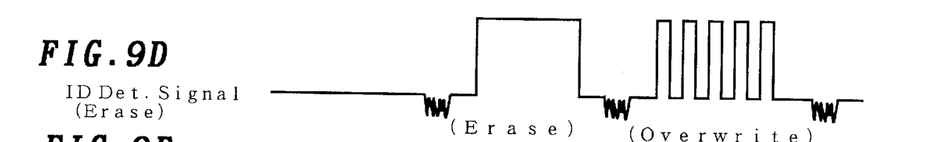

Further, at the time of ordinary erasure or at the time of automatic erasure of previous information before overwriting, the laser light amount is increased. During the erasure, therefore, the DC level of the ID detection signal produced as a result of detecting bits by the reflected light relatively increases, with the result that the DC fluctuation occurs in the reproduced signal (FIG. 9D).

Figure 9E:
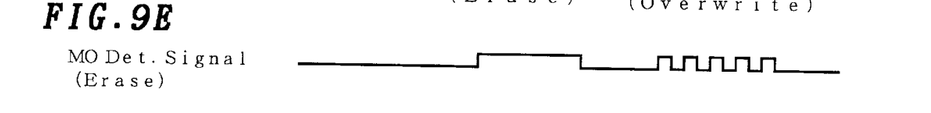

In the process, the MO detection signal, which represents a difference, is inherently absent. Actually, however, some failure of in-phase rejection due to the variations (such as optical imbalances) between the component elements of the detection system causes DC level fluctuations (FIG. 9E). Also at the time of erasure, the ID detection signal (such as the sector mark or address portion) is required to be reproduced from the reproduced signal including a combination of the ID detection signal and the MO detection signal for specifying the erased portion, and therefore the difference in DC level must be suppressed.

In order to solve the problem of DC level fluctuations, the DC components are suppressed by the AC coupling.

[Difficulty of selecting the time constant for AC coupling]

In conventional modulation schemes for recording data such as EFM described above, 0s and 1s are contained at uniform rate. Substantially no DC components are, therefore, contained in the reproduced signal, and no problem was posed to make it difficult to select the time constant for AC coupling.

In the case where DC components are contained in the reproduced signal as in the RLL modulation, however, the mere AC coupling encounters the problem that a correct reproduced signal cannot be read.

Figure 7B:
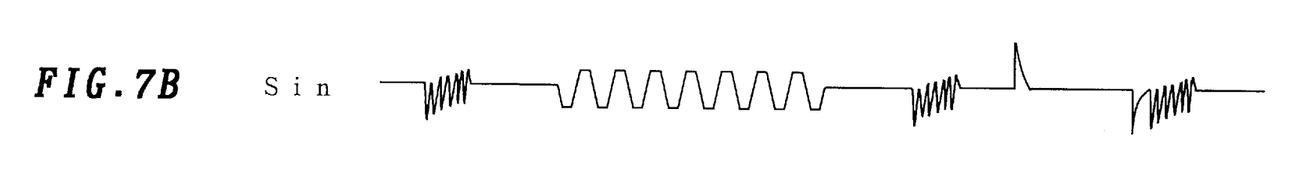

Specifically, with the reduction of the time constant for AC coupling, as shown in FIG. 7B, the reproduced signal Sin has a reduced interrupted portion of data including the transient period due to the AC coupling such as the leading portion of the address component Sa or the data component Sd. In spite of the resulting steep rise of each component, the loss of the DC components to be contained in the reproduced signal makes correct reproduction difficult, thereby leading to the problem of deteriorated playback characteristics.

Figure 7C:
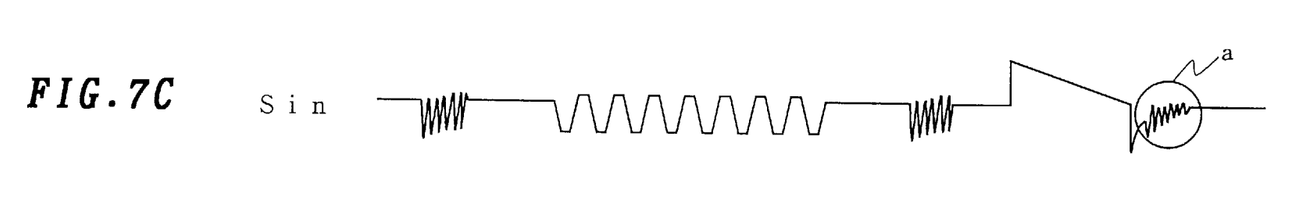

In the case where the time constant for AC coupling is increased, in contrast, as shown in FIG. 7C, the loss of the DC components to be contained in the reproduced signal Sin is prevented. The transient state in the leading portion of the address component Sa and the data component Sd, however, becomes longer in period, and the reproduction becomes difficult of the leading portions (such as the signal component indicated by the circle a) of the reproduced signal Sin. This phenomenon is conspicuous especially in the mark edge recording shown in FIG. 6.

In the case where the reproduced signal is AC-coupled with a predetermined time constant as described above, a small time constant will shorten the period of transient state and causes the loss of the DC components inherently required of the reproduced signal, thereby making correct reproduction difficult. With an excessively large time constant, on the other hand, a longer period of transient state results. In such a case, although the DC components of the reproduced signal are not lost, the reproduction becomes difficult of the leading portion of the address component Sa and the data component Sd.

In order to realize a high data density and a high bit rate, the use of a modulation scheme such as (1, 7)-RLL is considered preferable. The (1, 7)-RLL modulation, unlike the EFM modulation, does not take into consideration the suppression of DC components. Take the above-mentioned problem as an example. As long as a modulation scheme such as the (1, 7)-RLL modulation is employed which inherently contains DC components, data may not be read by the mere suppression of the DC components by AC coupling.

More specifically, the (1, 7)-RLL modulation has a minimum run of d=1 and a maximum run of k=7 with at least a 0 inserted between a 1 and a 1 and a maximum run of seven 0s. Assume that the AC coupling is carried out with a comparatively short time constant to quickly reproduce the sync data included in the leading portion of each sector. In the case where comparatively long runs successively appear in the immediately-following data portion to be reproduced, the DC components inherently contained in such a portion are lost. Proper binarization thus becomes impossible in subsequent stages.

In the case where the AC coupling is effected with a comparatively large time constant to properly reproduce the DC components inherently contained in comparatively long successive runs, on the other hand, the transient state in the reproduction of sync data continues for a long time in the leading portion of the sector. Correct reproduction of the sync data therefore becomes impossible during such a period.

The present invention has been developed in view of the above-mentioned problems, and the object of the invention is to provide a playback circuit with a simple configuration which can prevent the loss of the DC components to be inherently contained in the reproduced signal and at the same time can shorten the period of transient state in the interrupted data portion.

DISCLOSURE OF THE INVENTION

A playback circuit according to the present invention is used with a playback system for reproducing a recording medium having sequentially recorded therein data signals and sync signals used for synchronizing the reproduction of the data signals. The playback circuit comprises read means for generating a reproduced signal by reading the data signals and the sync signals, AC coupling means for selecting a first time constant or a second time constant larger than the first time constant and generating a corrected reproduced signal by AC-coupling the selected time constant to the reproduced signal, detection means for outputting a detection signal indicating the timing for the read means to read the sync signals, control means for controlling the AC coupling means in such a manner as to select the first time constant for a period from the first timing determined on the basis of the detection signal to the second timing a predetermined time after the fist timing and select the second time constant at the second timing, digitization means for generating a binary corrected reproduced signal by binarizing the corrected reproduced signal, and demodulation means for demodulating the data signals from the binary corrected reproduced signal.

As a result, first, the DC level fluctuations of the input signal containing the information data and the sync data are suppressed in the AC coupling circuit. Depending on the selection of the time constant for the AC coupling circuit, however, the DC level may be lost. In the input signal format, however, the DC level is sometimes used for reproducing (demodulating) the input signal as one of effective signal components.

In the case where a DC level is lost for suppressing the fluctuations of the DC level in the AC coupling circuit, therefore, the input signal having the signal format described above cannot be reproduced effectively.

In the playback circuit according to the present invention, however, the time constant of the AC coupling circuit is switched at a predetermined timing by the control means for controlling the AC coupling means. By appropriately regulating this timing, therefore, it is possible to switch the time constant of the AC coupling circuit upward, for example, during the period when the DC level is required to be handled as an effective signal component. The loss of the DC level from the input signal can thus be prevented and the input signal can be processed properly for reproduction.

Further, in the playback circuit for the above-mentioned playback system, the recording medium has sequentially recorded therein sectors having a sector mark indicating the leading portion of the sector, the sync data and the information data along the track. The detection means outputs a detection signal when the reproduced signal read by the read means is derived from the sector mark.

More specifically, the time constant of the AC coupling circuit is set downward, so that upon detection of the sector mark by the detection means, the control means for controlling the AC coupling means outputs a switching signal. On the basis of the output of this switching signal, the time constant of the AC coupling circuit is switched upward. The loss of the DC level contained in the information data can thus be prevented. Especially when reading the leading portion of the sync data, the time constant of the AC coupling circuit is comparatively small, and therefore the duration of the transient state is so short that the signal level rises steeply. Therefore, the sync data can be detected by the detection means.

Further, the AC coupling means of the playback circuit for the above-mentioned playback system according to the invention includes a capacitor with an end thereof connected to the output of the read means, a plurality of resistors with an end thereof connected to the other end of the capacitor, and connecting means for selectively grounding the other end of the resistors by the control means.

The time constant of the AC coupling circuit, therefore, can be appropriately switched simply by the operation of selectively grounding the other end of a plurality of the resistors by the control means. The configuration for switching the time constant of the AC coupling circuit can thus be greatly simplified.

BEST MODE OF CARRYING OUT THE INVENTION

The feature of the present invention resides, in short, in the fact that the time constant for AC coupling is changed in accordance with the characteristics of each element of data recorded. Specifically, the AC coupling with a comparatively small time constant is carried out for the leading portion of each sector of the recording data. In this case, the transient state is terminated into a steady state within a short time to assure detection of the leading portion. For the recording data portion inherently having DC components, on the other hand, a comparatively large time constant is used for AC coupling in order to correctly reproduce the DC components of the particular data portion.

A digital signal playback circuit according to the present invention will be explained below with reference to FIGS. 1 to 5 showing an application to a playback system for reproducing the data recorded in a magneto-optical disk.
[Playback circuit]

Figure 1:
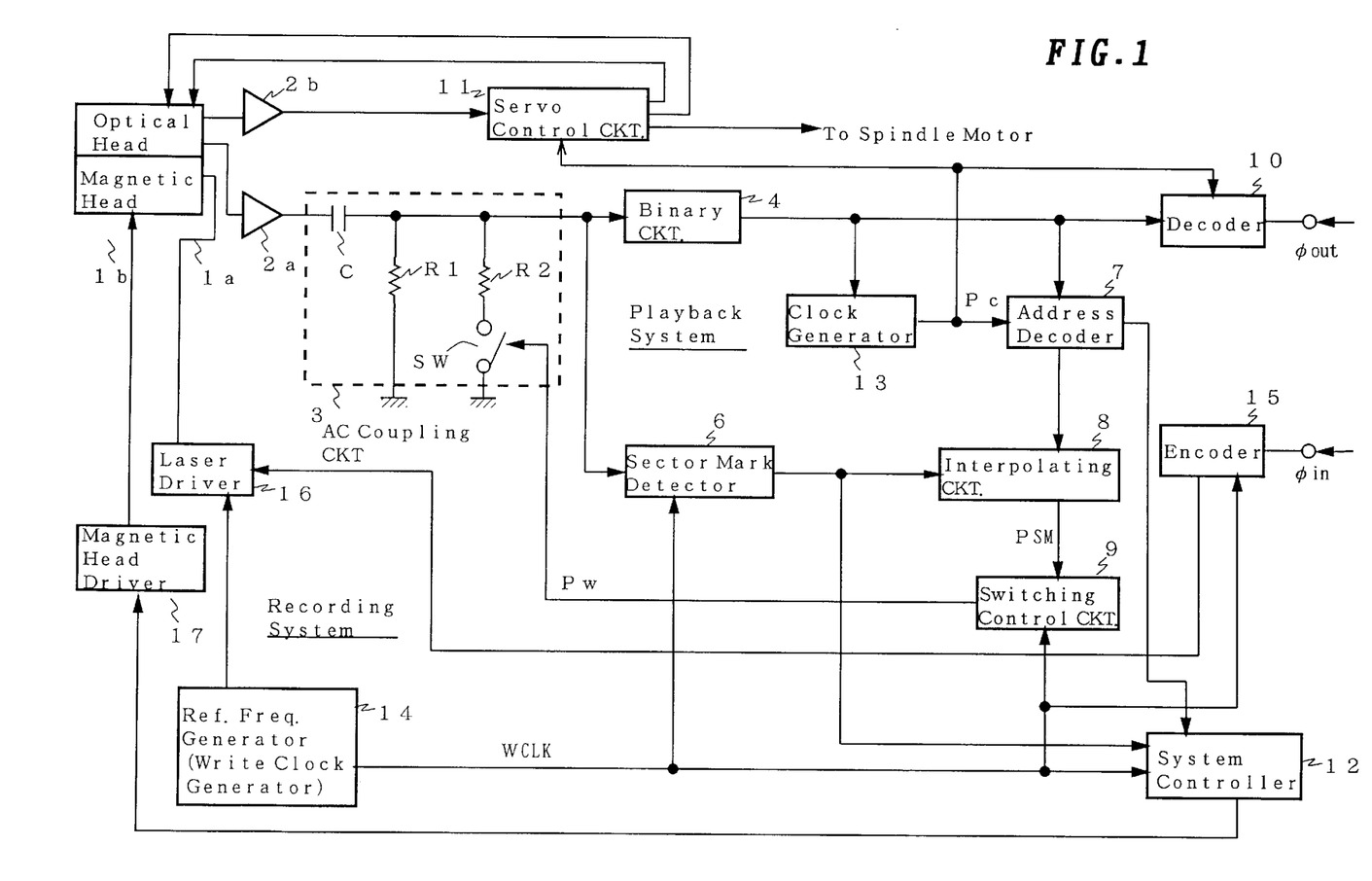
FIG. 1 is a diagram showing a configuration of the essential parts of a magneto-optical disk system according this embodiment.

The magneto-optical disk system according to this embodiment generally includes a playback system and a recording system shown in FIG. 1. The magneto-optical disk system further includes an optical head 1a for applying a write laser light and a read laser light to a magneto-optical disk (not shown) and a magnetic head 1b for applying a magnetic field to the magneto-optical disk at the time of recording. First, for facilitating the understanding of the magneto-optical disk system, the data format for the magneto-optical disk will be explained with reference to FIG. 2.

(Data format of recording medium)

The standardization work for data communication is under way at the hands of TC1 (Joint Technical Committee) of ISO (International Organization for Standardization) and IEC (International Electrotechnical Commission). The optical disk is handled by SC23 (Subcommittee).

In the current 5.25-inch magneto-optical disk determined by this subcommittee, the user data area is defined as 30 to 60 mm for which the track numbers 0 to 18750 are assignable, and each track is preformatted into 17 sectors (1024 bytes) or 31 sectors (512 bytes).

As an example, FIG. 2 shows the sector format of the 5.25-inch magneto-optical disk having 512 bytes per sector and the sector format of the 5.25-inch magneto-optical disk having 1024 bytes per sector announced as ISO/IEC JTC1/SC23.14517. The difference between these sector formats lies only in the data field and the length of the succeeding buffer. These sector formats will be briefly described followed by the description of the relation thereof to the present invention.

Figure 2A:
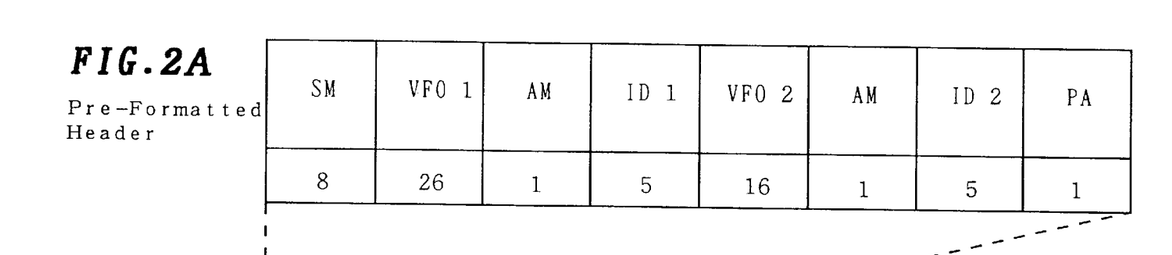
FIG. 2 is a diagram for explaining a sector format used for a magneto-optical disk providing a recording medium for the magneto-optical disk system shown in FIG. 1.
Figures 2B, 2C:
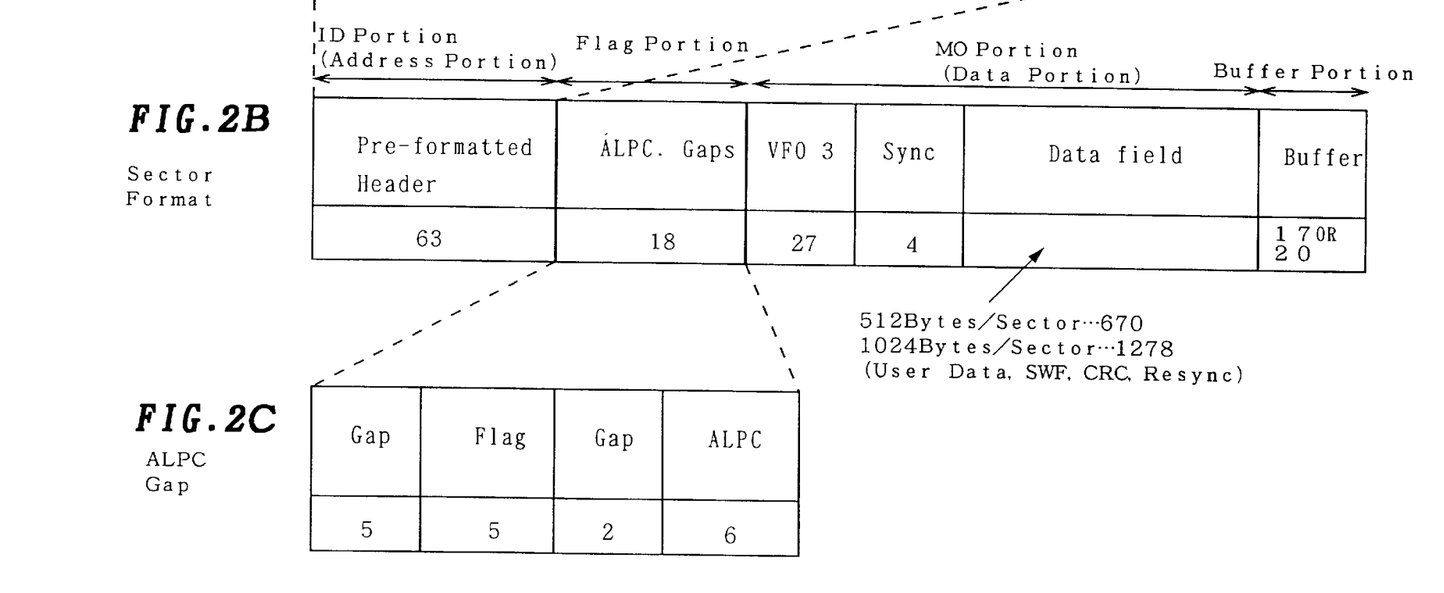

The sector format shown in FIG. 2B is roughly divided into an ID section (address section), a flag section, an MO section (data section) and a buffer section. Among these sections, the address section is an area indicating the physical block addresses on the disk and is preformatted on a substrate. The flag section is an area where a flag indicating the status of data in the sector is written. The data section is an area where the data to be used by the user is recorded. The buffer section is an area which provides a margin of fluctuations of disk rotation and is adapted to prevent the superposition of data and address even in the case of displacement due to the rotational jitter or the like at the time of recording.

Each area will be described in more detail. The address section (preformatted header) shown in FIG. 2A starts with a leading pattern called the sector mark SM, followed by several (two in the shown case) repetitions of an address information pattern including a combination of a VFO (Variable Frequency Oscillator) indicating the rotational phase of the disk in actual rotation, an AM (Address Mark) indicating the starting position of the address data and an ID (Identifier) having a track number and a sector number as an identification signal. This address section is terminated by a PA (Postamble). According to this embodiment, taking advantage of the fact that the VFO alternates between 1s and 0s most frequently during a short duration and therefore is assured to contain no DC components, the time constant for AC coupling is altered during the VFO period as described later.

The two IDs are repeatedly written with the same ID symbols. Each ID includes, in addition to the identification symbols of the track number and the sector number, a CRC (Cyclic Redundancy Check) code for detecting an error.

The flag portion (ALPC gap) shown in FIG. 2C includes a flag indicating the completion of a write operation, a mark (ODF Offset Detection Flag) for detecting a tracking offset in the push-pull method and a test portion (ALPC: Auto Laser Power Control) for regulating the level of laser power.

The data portion includes an area for writing the VFO (Variable Frequency Oscillator) providing a continuous data pattern for PLL locking, an area for writing SYNC providing a sync signal for the data, and a data field as an area for writing user data or the like. The data field is written with not only the user data but with the control bytes for causing a replacement sector to accommodate a defect which may be caused in an intended sector, the CRC (Cyclic Redundancy Check) code providing redundant words for error correction, and a RESYNC providing a special code pattern for synchronization.

(Configuration of playback circuit)

Now, refer to FIG. 1 again. An optical head 1a emits a recording laser light to a magneto-optical disk (not shown) in which data are recorded in accordance with the above-mentioned sector format, and a magnetic head 1b applies a magnetic field to the magneto-optical disk at the time of recording. In stages subsequent to the optical head 1a, the playback system includes first and second RF amplifiers 2a and 2b supplied with a detection signal from a photo-detector (not shown) for converting the laser light returned from the magneto-optical disk into an electrical signal.

The last stage of the first RF amplifier 2a is connected with an AC coupling circuit 3, a sector mark detector 6, a binary circuit 4, a clock generator 13, an address decoder 7, an interpolation circuit 8, a switching control circuit 9 and a decoder 10. Also, the last stage of the second RF amplifier 2b is connected with a servo control circuit 11.

The recording system, on the other hand, is connected with an encoder 15 for encoding the recording data and a laser driver 16 for driving the optical head 1a in the last stage of the encoder 15. The recording system includes a magnetic head driver 17 for driving the magnetic head 1b and a reference frequency generator 14 for generating a write clock WCLK.

Further, the magneto-optical disk according to this embodiment is configured with a system controller 12 for controlling the above-mentioned various circuits. In FIG. 1, every control line leading from the system controller 12 to each circuit element is not shown for eliminating the complication of the drawing. Now, each circuit block of the magneto-optical disk system will be briefly explained.

(RF amplifier)

The first RF amplifier 2a is a circuit for amplifying the data signal containing subcodes in the reproduced signal output from the optical head 1a. The second RF amplifier 2b is a circuit for amplifying the tracking error signal and the focus error signal in the reproduced signal output from the optical head 1a. The tracking error signal and the focus error signal produced from the second RF amplifier 2b are supplied to a servo control circuit 11.

(Servo control circuit)

The servo control circuit 11 has built therein a focus servo circuit, a tracking servo circuit and a spindle servo circuit, and a motor servo circuit for controlling the motor constituting a driving source for various moving mechanisms. These servo circuits are supplied with a servo drive control signal including data for servo control (such a servo gain) and a drive signal from the system controller 12 and various error signals from the second RF amplifier 2b.

The spindle servo circuit drives the spindle motor (not shown) providing a rotational drive source for the magneto-optical disk on the basis of a clock pulse Pc input thereto from the clock generator 13 and thus rotationally drives the magneto-optical disk with CLV (constant linear velocity) or CAV (constant angular velocity).

The focus servo circuit controls the driving of a secondary actuator (not shown) of the optical head 1 on the basis of a focus error signal from the second RF amplifier 2b, or specifically, on the basis of a signal produced by predetermined calculations in the second RF amplifier 2b from the detection signal corresponding to the amount of the laser light reflected from the mirror surface of the magneto-optical disk. The focus servo circuit thus adjusts the focal point of the objective lens not shown by moving it toward or away from the magneto-optical disk.

The tracking servo circuit drives and controls the secondary actuator of the optical head 1 on the basis of a tracking error signal produced from the second RF amplifier 2b, or specifically, on the basis of a signal obtained by predetermined calculations made in the second RF amplifier 2b from the detection signal of servo bits within the servo area formed in the magneto-optical disk. The tracking servo circuit thus adjusts the tracking of the objective lens by moving it along the radial direction of the magneto-optical disk D.

(AC coupling circuit)

The AC coupling circuit 3 includes a coupling capacitor C connected to a reproduced signal line led from the first RF amplifier 2a, two resistors (a first resistor R1 and a second resistor R2) connected in parallel between the reproduced signal line and the ground in the stage subsequent to the coupling capacitor C and a switching circuit SW connected between the ground and one (the second resistor R2 in the shown case) of the resistors R1 and R2. This switching circuit SW is adapted to be controlled by a window pulse Pw produced from a switching control circuit 9 described later. The switching circuit SW thus turns on when the window pulse Pw is high in level, and turns off in response to the low level of the same pulse, for example.

(Binary circuit)

The binary circuit 4 is for sample-holding and converting the data signal input through the AC coupling circuit 3 into binary digital data.

(Clock generator)

The clock generator 13 detects the clock bit component from the digital data output from the binary circuit 4 and generates a clock pulse Pc on the basis of the clock bit component. Specifically, in the case where the magneto-optical disk is of sample servo type, for example, the clock generator 13 detects the clock bit formed with the servo bit in the servo area. This clock bit detection signal is multiplied by a PLL circuit or the like thereby to generate a clock pulse Pc providing a reference timing signal for the system.

(Address decoder)

The address decoder 7 is a circuit for producing an address by decoding the subcode contained in the digital data from the binary circuit 4 on the basis of the clock pulse Pc input from the clock generator 13.

(Decoder)

The decoder 10 is a circuit for decoding the error correction or the like code added to the digital data output from the binary circuit 4 and outputting a reproduced data D. The reproduced data D from the decoder 10 is output externally through an output terminal out.

(Sector mark detector)

Figure 4A:
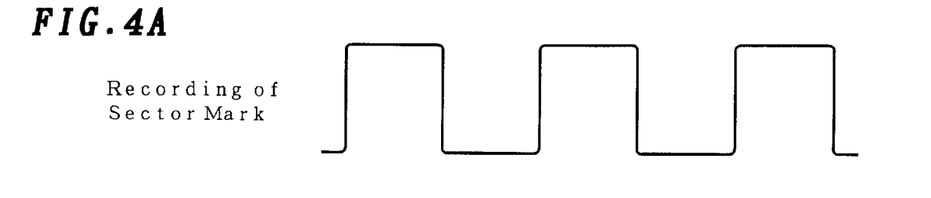
FIGS. 4A to 4D are diagrams for explaining the sector mark detecting operation for the sector mark detector of the magneto-optical disk system shown in FIG. 1.
Figure 4B:
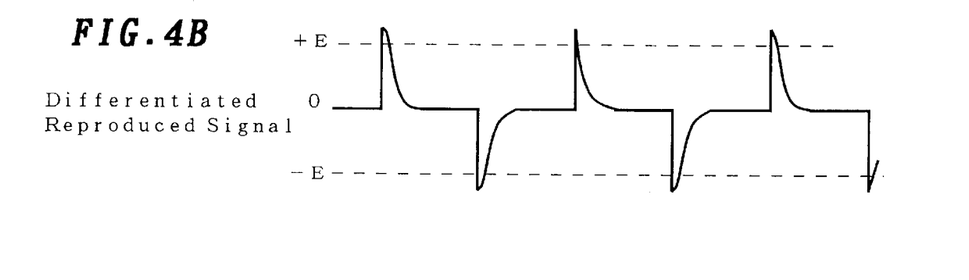
Figure 4C:
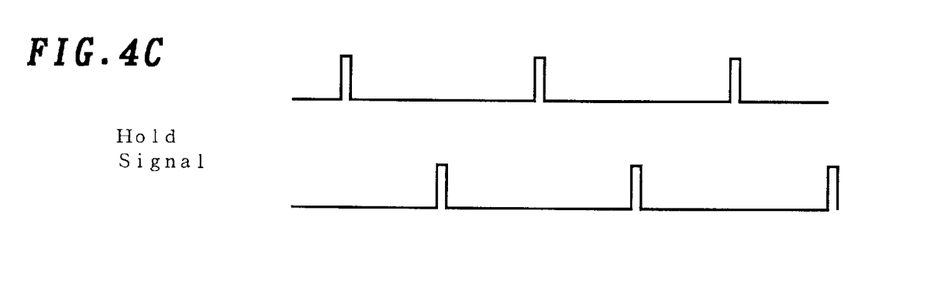
Figure 4D:
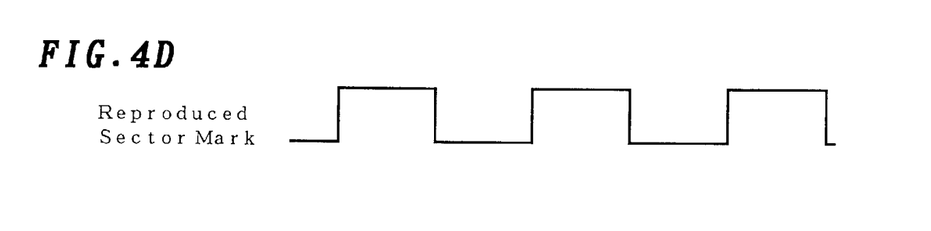

The sector mark detector 6 is a circuit for detecting the sector mark contained in the reproduced signal output from the AC coupling circuit 3. As shown in FIG. 4, for example, a sector mark is detected by a method different from the normal method of detection based on binarization. Instead, the reproduced signal read out as a recorded sector mark (FIG. 4A) is differentiated (FIG. 4B), and a signal in excess of a predetermined level ξE is held (FIG. 4C), so that the sector mark is reproduced and detected through a flip-flop circuit (bistable multivibrator), for example (FIG. 4D). Consequently, in view of the fact that the AC coupling is effected with a comparatively small time constant by the AC coupling circuit 3 in the preceding stage, the transient period of the reproduced signal is short and the signal level rises steeply during the period of sector mark detection. The sector mark thus is detected easily.

Returning to FIG. 1, the address detected in the address decoder 7 and the sector mark detected in the sector mark detector 6 are applied to a system controller 12 and an interpolator 8, respectively, in subsequent stages.

The address and the sector mark applied to the system controller 12 are used for controlling the scanning position of the optical head 1 at the time of seek operation, for example.

(Interpolator)

The interpolator 8 is a circuit for interpolating the address or the sector mark in the case where an address requiring detection in the address decoder 7 or a sector mark requiring detection in the sector mark detector 6 is lacking. Specifically, the clock pulse Pc supplied from the clock generator 13 and/or the address detected in the address decoder 7 is used for interpolating the lacking address or the lacking sector mark.

The interpolator 8 produces a sector mark detection pulse Psm on the basis of the detection timing of the sector mark in the sector mark detector 6 or on the basis of the appearance timing of a sector mark by the interpolation of the lacking sector mark.

Figures 3A, 3B:
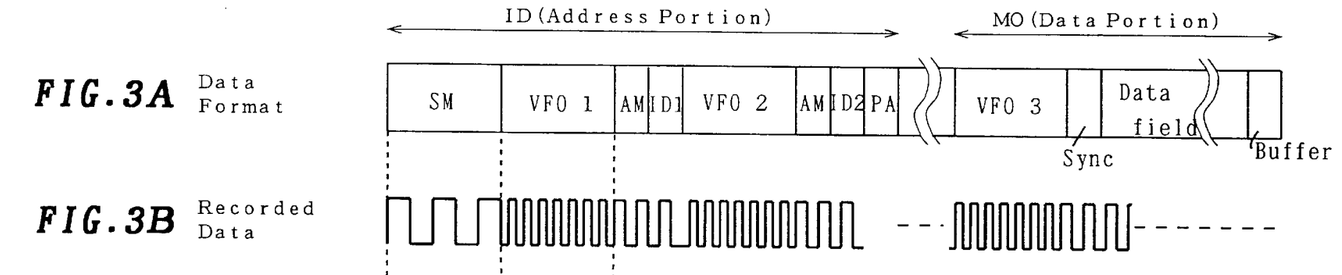
FIG. 3 is a diagram showing signal waveforms of the magneto-optical disk system shown in FIG. 1.
Figure 3C:
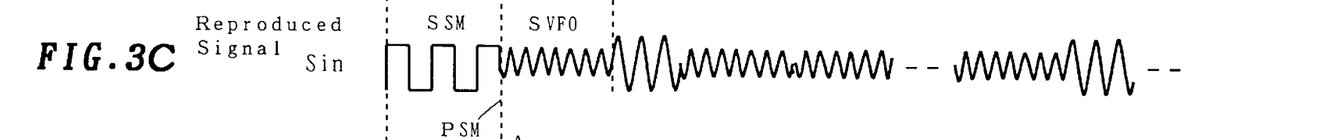
Figure 3D:
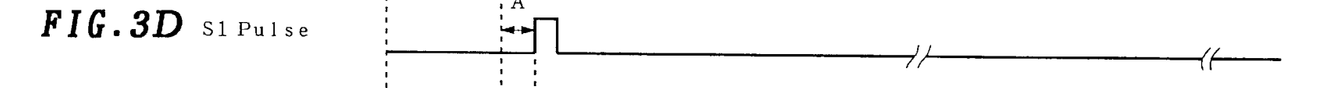
Figure 3E:
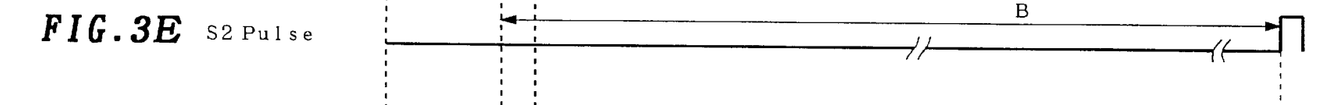
Figure 3F:
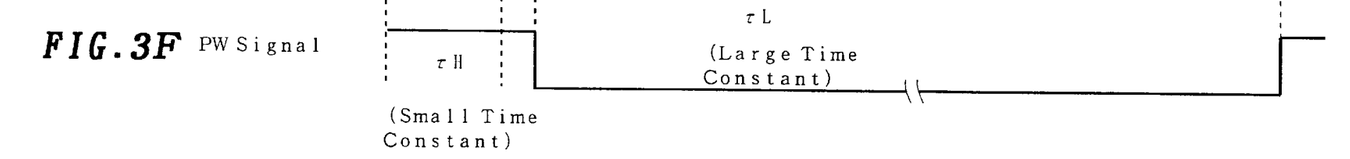

Refer to the reproduced signal Sin output from the first RF amplifier 2a. The reproduced signal Sin, as shown in FIG. 3C, is produced first as a signal waveform SSM indicating a sector mark, and then as a signal waveform SVFO indicating VFO in continuous fashion. Upon detection of the signal SSM indicating the sector mark by the sector mark detector 6 or upon interpolation of the signal SSM indicating the sector mark by the interpolator 8, the interpolator 8 outputs a sector mark detection pulse PSM to the switching control circuit 9.

(Switching circuit)

With reference to FIG. 3, the operation of the switching control circuit 9 will be explained. The switching control circuit 9 generates and outputs a window pulse Pw for controlling the switching circuit SW in the AC coupling circuit 3 on the basis of the sector mark detection pulse SSM input from the interpolator 8.

Specifically, this switching control circuit 9 has a gate circuit and two counters not shown. The gate circuit is set in such a manner as to output a high-level signal as a window pulse Pw in initial stages. In response to the input of the sector mark detection pulse PSM from the interpolator 8 to this gate circuit, the first and second counters start counting. The first counter produces an S1 trigger pulse so that the output window pulse Pw of the gate circuit is reduced to a low-level signal after the lapse of a first predetermined time length (A) and raised to a high-level signal after the lapse of a second predetermined time length (B).

The first counter is adapted to store the initial value A on the basis of the sector mark detection pulse PSM input from the interpolator 8. This initial value A is a count value corresponding to the first predetermined time length A in which the transient state of the VFOL is converged from the time point of sector mark detection and represents eight bytes (96 clocks), for example.

At the time point when the sector mark detector 6 detects the sector mark from the reproduced signal Sin while a high-level signal is produced as a window pulse Ps from the gate circuit, the interpolator 8 produces a sector mark detection pulse PSM. As a result, the first counter starts the counting operation, after which the internal initial values are updated by −1 sequentially on the basis of the write clock WCLK input from the reference frequency generator 14. After the lapse of the first predetermined time length on the first counter (say, after the lapse of 96 clocks representing eight bytes), a S1 trigger pulse is generated, so that the window pulse Pw output from the gate circuit is reduced to low level. At the same time, the initial value A is set again in the first counter.

In similar fashion, the second counter is adapted to store the initial value B on the basis of the sector mark detection pulse PSM input from the interpolator 8. This initial value B represents a count value corresponding to the second predetermined time length B lasting to the end of the data field from the time point of sector mark detection. At the time point when the sector mark detector 6 detects the sector mark from the reproduced signal Sin while a high-level signal is produced as a window pulse Pw from the gate circuit, the interpolator 8 produces a sector mark detection pulse PSM, whereby the second counter begins counting. After that, the internal initial values are sequentially updated by −1 on the basis of the write clock pulse WCLK input from the reference frequency generator 14. After the lapse of the second predetermined time length on the second counter, an S2 trigger pulse is generated so that the window pulse Pw output from the gate circuit is raised to high level. At the same time, the initial value B is set again in the second counter.

As a consequence, the signal output from the gate circuit of the switching control circuit 9 is reduced to low level up to the time point when the second trigger pulse S2 is output after the time point when the first trigger pulse S1 is output. During the remaining period, the window pulse Pw assumes high level.

(Operation of AC coupling circuit)

The switching circuit SW of the AC coupling circuit 3, on the other hand, turns on when the window pulse Pw output from the switching control circuit 9 is at high level, and turns off when the same pulse is at low level. During the period when the window pulse Pw is high, therefore, the time constant $n_H$ of the AC coupling circuit 3 is given as the product $C(R1R2/(R1+R2))$ of the capacitance C and the combined resistance (the sum of the first resistance R1 and the second resistance R2), while the time constant $n_L$ during the period when the window pulse Pw is low is expressed as the product CR1 of the capacitance C and the first resistor R1.

In other words, the time constant $n_H$ during the period when the window pulse Pw is at high level assumes a value smaller than the time constant $n_L$ during the time when the window pulse Pw is at low level.

Thus, time constant switching means for switching the time constant of the AC coupling circuit is configured of the switching circuit SW of the AC coupling circuit 3, the sector mark detector 6, the interpolator 8, the switching control circuit 9 and the reference frequency generator 14.

(Operation of playback circuit)

Now, the operation of the playback circuit according to the present embodiment will be described with main emphasis placed on the reproduced signal produced from the first RF amplifier 2a.

In the playback system, the information having the sector format shown in FIG. 3 recorded in the magneto-optical disk (not shown) is read through the optical head 1a and the first RF amplifier 2a. The DC components of this reproduced signal are suppressed by the AC coupling circuit 3. The information of the address portion mainly specified by the sector format is processed in the sector mark detector 6, the clock generator 13, the address decoder 7, etc. of the playback system. More specifically, the sector mark is detected by the sector mark detector 6 and the resulting sector mark detection signal is applied to the interpolator 8. Further, the VFO digitized through the binary circuit 4 is synchronized at the clock generator 13 and the resulting clock pulse Pc is applied to the address decoder 7, the servo control circuit 11, etc. Also, the address of AM is detected by the address decoder 7 and applied to the interpolator 8 and the system controller 12. The information in the data portion, on the other hand, is sent to the decoder 10 through the binary circuit 4. In the recording system, the write information is encoded by the encoder 15 and sent to the optical head 1a via the laser driver 16. At the same time, the system controller 12 energizes the magnetic head 1b through the magnetic head driver 17.

When the sector mark is detected by the sector mark detector 6 or interpolated by the interpolator 8, the sector mark detection pulse Psm is applied to the switching control circuit 9. The switching control circuit 9, on the other hand, counts the write clocks WCLK generated by the reference frequency generator 14 from the time point when the sector detection pulse Psm is input thereto, and generates a window pulse Pw for controlling the switch SW of the AC circuit at a predetermined time point.

When the window pulse Pw is in on state, the time constant of the AC coupling circuit 3 is $n_H$ (smaller than the time constant $n_L$). The response characteristic of the reproduced signal waveform Ss of the sector mark during this period, therefore, is considered to have such a characteristic as to have a short period of transient state and rise steeply.

Unlike in the ordinary method of detection by digitization, the sector mark is detected by a method in which the reproduced signal is differentiated and the signal in excess of a predetermined level of ξE is held and the sector mark is reproduced through a flip-flop circuit, for example. During the sector mark detection period, the AC coupling is effected with a comparatively small time constant. In this way, the signal level rises steeply with a short transient state of the reproduced signal, thereby making it possible to easily detect the sector mark. As a result, the dropping probability of the sector mark is considerably reduced for an improved detection accuracy of the sector mark.

As long as the window pulse Pw is in off state, on the other hand, the time constant of the AC coupling circuit 3 is $n_L$ (larger than the time constant $n_H$), and therefore the loss of the DC components contained in the reproduced signal Sin are assumed to have been substantially eliminated.

In addition, the information recorded in the magneto-optical disk has a predetermined format as explained with reference to FIG. 2, with the sector mark and the address recorded in a predetermined sequence and with a predetermined byte length. The appearance of each element of the reproduced signal read by the optical head 1a can ideally be interpolated (internally) by the interpolator 8 by means of the clock pulse Pc from the clock generator 13 and the address from the address decoder 7. The appearance of each element can thus be predicted. Even in the case where the sector mark is not detected, therefore, the switching control circuit 9 can determine the on/off timing of the window pulse Pw for controlling the switching circuit SW of the AC coupling circuit 3 on the basis of the sector mark detection signal PSM interpolated by the interpolator 8 and the write clock WCLK from the reference frequency generator 14.

In spite of this, this ideal condition cannot actually be maintained for long time due to the rotational irregularities of the magneto-optical disk. According to this embodiment, the sector mark is utilized as a sign of the appearance of each element of the reproduced signal. After the sector mark is detected by the sector mark detector 6 or it is interpolated by the interpolator 8, the element (point) of the sector format containing the information now being read is determined from the count value of the write clock WCLK produced by the reference frequency generator 14 with reference to the sector mark detection time point. In this way, the error generation can be considered substantially zero.

Once the sector mark is detected by the sector mark detector 6 or once the sector mark is interpolated by the interpolator 8, the data format is predetermined even in the case where the sector mark is not detected or interpolated from the sector subsequently read. Therefore, the timing at which the window pulse Pw is turned on or off can be determined by counting the write clocks WCLK from the reference frequency generator 14 by the counter included in the switching control circuit 9. The playback circuit according to the present embodiment, therefore, can operate even in the case where the sector mark fails to be detected or fails to be interpolated in all the sectors.

As described above, in the case of the (1, 7)-RLL scheme intended for an increased density of data recorded in the magneto-optical disk, for example, the DC components contained in the data are used for reproduction (demodulation) of the digital signal as one of effective signal components. In the process, if the DC level is eliminated in order to suppress the fluctuations of the DC level in the AC coupling circuit having a predetermined time constant, the digital signal having a signal as described above cannot be reproduced effectively.

In the playback circuit according to the present embodiment, however, the time constant of the AC coupling circuit 3 can be switched to $n_L$ ($>n_H$), and therefore elimination can be prevented of the DC components contained in the address of the address portion and the DC components contained in the data portion. It is thus possible to properly reproduce the address and data contained in the reproduced signal Sin by means of the address decoder 7 and the decoder 10.

(Modification of the AC coupling circuit)

Figure 5:
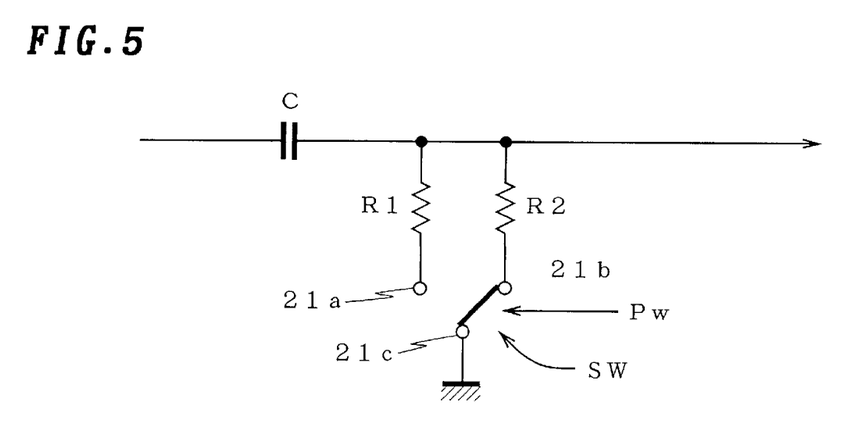
FIG. 5 is a circuit diagram showing another example configuration of the time constant switching circuit of the AC coupling circuit of the magneto-optical disk system of FIG. 1.

The playback circuit according to this embodiment includes the AC coupling circuit 3 configured of the capacitor C, the two resistors R1 and R2 and the switching circuit SW inserted between one (second resistor R2) of the two resistors R1, R2 and the ground. As shown in FIG. 5, however, one each of the terminals of the two resistors R1 and R2 may be configured as first and second fixed contacts 21a and 21b, respectively, and the switching circuit SW with the ground side thereof as a movable contact 21c inserted, so that the first resistor R1 and the second resistor R2 may be switched selectively in accordance with the level of the window pulse Pw.

In this case, as long as the window pulse Pw is at high level, the fixed contact 21a of the first resistor R1 low in resistance value and the movable contact 21c thereof are electrically connected, while in the case where the window pulse Pw is at low level, the second fixed contact 21b of the second resistor R2 high in resistance value and the movable contact 21c thereof are electrically connected to each other.

Also, the AC coupling circuit 3 can be configured with a small time constant at least during the time when the sector mark is output and with a large time constant during the time when the address or the data is output. In addition to the above-mentioned configuration, therefore, various configurations can be employed with equal effect. As an example, three or more resistors may be switched selectively in accordance with the level of the window pulse Pw, or a plurality of capacitors connected in parallel to the reproduced signal line may be selectively switched in accordance with the level of the window pulse Pw.

Further, the AC coupling circuit is equivalent to a high-pass filter (HPF). Specifically, the AC coupling circuit with a small time constant corresponds to a high-pass filter with a comparatively high cut-off frequency, while an AC coupling circuit with a large time constant corresponds to a high-pass filter with a comparatively low cut-off frequency. Even in the case where the AC coupling circuit according to this embodiment is replaced by any arbitrary high-pass filter having a changeable cut-off frequency, therefore, such a modification is included in the technical range of the present invention.

As described above, the digital signal playback circuit according to this invention comprises an AC coupling circuit for suppressing the fluctuations of the DC level contained in the input digital signal and a time constant switching circuit for switching the time constant of the AC coupling circuit at a predetermined timing. It is thus possible to eliminate the loss of the DC components to be contained in the reproduced signal with a simple configuration, while at the same time shortening the duration of the transient state in the interrupted data portion.

What is claimed is:

1. A playback apparatus for reproducing information data and playback synchronization data recorded sequentially along tracks of a recording medium, said apparatus comprising:

read means for reading said information data and said synchronization data and generating a reproduced signal;

AC coupling means for selecting one of a first time constant and a second time constant larger than said first time constant and AC-coupling said selected time constant to said reproduced signal thereby to generate a corrected reproduced signal;

detection means for producing a detection signal indicating a timing for said read means to read said synchronization data;

control means for controlling said AC coupling means in such a manner as to select said first time constant during the time from a first timing determined on the basis of said detection signal to a second timing a predetermined time later and to select said second time constant at said second timing;

binary means for binarizing said corrected reproduced signal and generating a binary corrected reproduced signal; and demodulation means for demodulating an information signal from said binary corrected reproduced signal.

2. A playback apparatus according to claim 1, wherein said AC coupling means includes:

a capacitor with an end thereof connected to an output of said read means;

a plurality of resistors with an end thereof connected to the other end of said capacitor; and connecting means for grounding the other end of said resistors selectively by means of said control means.

3. A playback apparatus according to claim 1, wherein said information data contains DC components.

4. A playback apparatus according to claim 3, wherein the information data containing said DC components is pulse-modulated by a (1, 7)-RLL conversion.

5. A playback apparatus according to claim 1, wherein said recording medium has sequentially recorded therein a sector mark indicating a leading portion of a sector and a sector having said synchronization data and said information data along said track, and said detection means outputs said detection signal in the case where said reproduced signal read by said read means is produced from said sector mark.

6. A playback apparatus for reproducing information data and playback synchronization data recorded sequentially along tracks of a recording medium, said apparatus comprising:

read means for reading said synchronization data and said information data and generating a reproduced signal;

first AC coupling means for generating a first corrected reproduced signal by AC-coupling said reproduced signal with a first time constant;

second AC coupling means for generating a second corrected reproduced signal by AC-coupling said reproduced signal with a second time constant larger than said first time constant;

detection means for outputting a detection signal indicating a timing for said read means to read said synchronization data;

selection means for selectively outputting said first corrected reproduced signal during the period from a first timing determined on the basis of said detection signal to a second timing a predetermined after said first timing and selectively outputting said second corrected reproduced signal at said second timing;

binary means for digitizing said first and second corrected reproduced signals and generating a binary corrected reproduced signal; and demodulation means for demodulating information data from said binary corrected reproduced signal.

* * * * *